(12) United States Patent
Stoyanchev et al.

(10) Patent No.: US 11,724,403 B2
(45) Date of Patent: *Aug. 15, 2023

(54) SYSTEM AND METHOD FOR SEMANTIC PROCESSING OF NATURAL LANGUAGE COMMANDS

(71) Applicant: HYUNDAI MOTOR COMPANY and KIA CORPORATION, Seoul (KR)

(72) Inventors: Svetlana Stoyanchev, Jersey City, NJ (US); Srinivas Bangalore, Morristown, NJ (US); John Chen, Millburn, NJ (US); Hyuckchul Jung, Basking Ridge, NJ (US)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 662 days.

This patent is subject to a terminal disclaimer.

(21) Appl. No.: 16/783,547

(22) Filed: Feb. 6, 2020

(65) Prior Publication Data

US 2020/0171670 A1    Jun. 4, 2020

Related U.S. Application Data

(63) Continuation of application No. 15/705,320, filed on Sep. 15, 2017, now Pat. No. 10,556,348, which is a continuation of application No. 14/557,005, filed on Dec. 1, 2014, now Pat. No. 9,764,477.

(51) Int. Cl.
*B25J 13/00* (2006.01)
*G06F 40/30* (2020.01)

(52) U.S. Cl.
CPC ............ *B25J 13/003* (2013.01); *G06F 40/30* (2020.01)

(58) Field of Classification Search
CPC ................................ B25J 13/003; G06F 40/30
USPC .......................................................... 700/246
See application file for complete search history.

(56) References Cited

U.S. PATENT DOCUMENTS

| | | | |
|---|---|---|---|
| 7,451,086 B2 | 11/2008 | Ichnowski | |
| 7,475,015 B2 | 1/2009 | Epstein et al. | |
| 7,555,426 B2 | 6/2009 | Wang | |
| 7,870,000 B2 | 1/2011 | Ativanichayaphong et al. | |

(Continued)

OTHER PUBLICATIONS

Woodley Packard, UW-MRS: Leveraging a Deep Grammar for Robotic Spatial Commands, InSemEval@ COLING Aug. 23, 2014 (pp. 812-816) (Year: 2014).*

(Continued)

*Primary Examiner* — David P Zarka
(74) *Attorney, Agent, or Firm* — Morgan, Lewis & Bockius LLP

(57) ABSTRACT

A system, method and computer-readable storage devices are for processing natural language commands, such as commands to a robotic arm, using a Tag & Parse approach to semantic parsing. The system first assigns semantic tags to each word in a sentence and then parses the tag sequence into a semantic tree. The system can use statistical approach for tagging, parsing, and reference resolution. Each stage can produce multiple hypotheses, which are re-ranked using spatial validation. Then the system selects a most likely hypothesis after spatial validation, and generates or outputs a command. In the case of a robotic arm, the command is output in Robot Control Language (RCL).

19 Claims, 4 Drawing Sheets

(56) References Cited

U.S. PATENT DOCUMENTS

| | | | |
|---|---|---|---|
| 8,050,929 | B2 | 11/2011 | Hu et al. |
| 8,583,416 | B2 | 11/2013 | Huang et al. |
| 8,639,517 | B2 | 1/2014 | Di Fabbrizio et al. |
| 8,700,403 | B2 | 4/2014 | Weng et al. |
| 8,706,491 | B2 * | 4/2014 | Chelba .................. G06F 40/205 704/231 |
| 8,768,687 | B1 | 7/2014 | Quasthoff et al. |
| 8,868,409 | B1 | 10/2014 | Mengibar et al. |
| 9,262,406 | B1 * | 2/2016 | Das ....................... G06F 40/151 |
| 9,764,477 | B2 * | 9/2017 | Stoyanchev ............ G06F 40/30 |
| 10,556,348 | B2 * | 2/2020 | Stoyanchev ............ G06F 40/30 |
| 2003/0149692 | A1 * | 8/2003 | Mitchell ............. G06F 16/3344 |
| 2005/0096913 | A1 | 5/2005 | Coffman et al. |
| 2010/0131260 | A1 | 5/2010 | Bangalore |
| 2010/0235165 | A1 * | 9/2010 | Todhunter ............... G06F 40/35 704/9 |
| 2014/0316764 | A1 | 10/2014 | Ayan et al. |
| 2016/0027199 | A1 * | 1/2016 | Cao ......................... G06F 3/017 345/420 |

OTHER PUBLICATIONS

Stoyanchev et al., AT&T: The Tag&Parse Approach to Semantic Parsing of Robot Spatial Commands, In SemEval@ COLING, pp. 109-113, (Aug. 24, 2014) (Year: 2014).*

Kais Dukes, SemEval-2014 Task 6: Supervised Semantic Parsing of Robotic Spatial Commands, Proceedings of the 8th International Workshop on Semantic Evaluation (SemEval 2014), pp. 45-53 (Aug. 24, 2014) (Year: 2014).*

Carreras et al., "A simple named entity extractor using AdaBoost," In *Proceedings of the CoNLL*, Edmonton, Canada, 2003.

Michael Collins, "Three generative lexicalized models for statistical parsing," in *Proceedings of the 35th Annual Meeting of the Association for Computational Linguistics*, 1997.

Dukes, Kais. "Semantic Annotation of Robotic Spatial Commands." Language and Technology Conference (LTC). Poznan, Poland. 2013.

P. Haffner, "Scaling large margin classiers for spoken language understanding," *Speech Communication*, 48(3-4):239-261, 2006.

Hirschman et al., "Muc-7 coreference task definition," in *Proceedings of the Message Understanding Conference (MUC-7)*, Science Applications International Corporation, 1997.

Huang et al., "Better k-best parsing," in *Proceedings of the Ninth International Workshop on Parsing Technology*, Parsing '05, pp. 53-64, Stroudsburg, PA, Association for Computational Linguistics.

Toutanova et al., "Feature-rich part-of-speech tagging with a cyclic dependency network," in *Proceedings of the 2003 Conference of the North American Chapter of the Association for Computational Linguistics on Human Language Technology*—vol. 1, 2003.

Stoyanchev et al., "Towards Natural Clarification Questions in Dialogue Systems,".

Guillevic et al., "Robust Semantic Confidence Scoring,".

Evang, Kilian, and Johan Bos. "RoBox: CCG with Structured Perceptron for Supervised Semantic Parsing of Robotic Spatial Commands." SemEval 2014(2014): 482.

Packard, Woodley. "UW-MRS: Leveraging a Deep Grammar for Robotic Spatial Commands." SemEval 2014 (2014): 812.

* cited by examiner

SYSTEM AND METHOD FOR SEMANTIC PROCESSING OF NATURAL LANGUAGE COMMANDS

PRIORITY INFORMATION

The present application is a continuation of U.S. patent application Ser. No. 15/705,320, filed Sep. 15, 2017, which is a continuation of U.S. patent application Ser. No. 14/557,005, filed Dec. 1, 2014, now U.S. Pat. No. 9,764,477, issued Sep. 19, 2017, the content of which are incorporated herein by reference in their entirety.

BACKGROUND

1. Technical Field

The present disclosure relates to processing spoken commands and more specifically to spoken commands directed to instructing a robotic arm to perform a task.

2. Introduction

Robotic appendages such as arms are becoming increasingly common. As such, users demand ever more intuitive ways to control and interact with such robotic arms. One traditional way is to control various degrees of mobility of the robotic appendage via a button, switch, slider, or other mechanical mechanism. Other control schemes include motion tracking or preprogramming repetitive motions. Each of these control schemes presents various problems, such as occupying a user's attention with pressing buttons or inflexibility outside the preprogrammed motions.

Spoken language commands and, more broadly, natural language interfaces could be more natural. However, natural language commands are difficult to interpret properly. Misinterpreted spoken language commands may be problematic, dangerous, or even nonsensical to execute. Thus, spoken language interfaces for robotic controls can be improved to better interpret spoken commands, or to better deal with misrecognized commands.

In simple systems, commands can be made up of only short sentences. For example, in a simple search system, every command is a search task. In more complex systems, the task is more difficult to ascertain. Commands are more complex and have a wider variety in the types of commands and arguments that the commands include. The task complexity increases, which can lead to additional difficulties in processing natural language commands. Generic semantic parsers do not have high accuracy in this problem domain.

DETAILED DESCRIPTION

Figure 1:
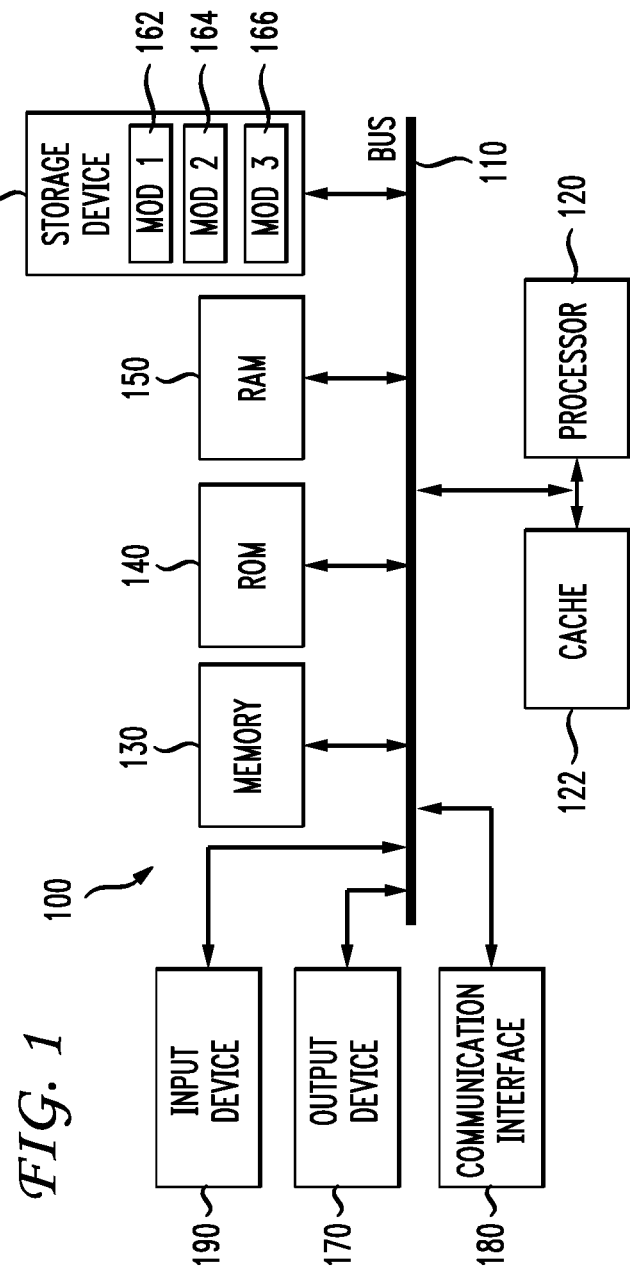
FIG. 1 illustrates an example system embodiment

A system, method and computer-readable storage devices are disclosed which perform supervised semantic parsing of commands, such as robotic spatial commands. In one example embodiment, the system produces a semantic parse of natural language commands addressed to a robot arm designed to move objects on a grid surface, though the same principles can be applied to different control scenarios in which a user controls other interactive machines or software components, such as an automobile, a virtual assistant, a freestanding robot, and so forth. In this example, each command directs the robot arm to change position of an object in a current configuration. A command uniquely identifies an object and its destination, as in the example natural language command "Move the turquoise pyramid above the yellow cube." The system can process each command generating an output Robot Control Language (RCL) parse. A robot arm controller or a robot arm simulator can process the output to control the robot arm to execute the command.

The system disclosed herein uses a tag and parse approach. The tag and parse approach separates semantic tagging and semantic parsing stages. Thus, the system performs four major tasks: 1) semantic tagging, 2) parsing, 3) reference resolution, and 4) spatial validation. The first three tasks can be based on applying supervised machine learning approach to semantically parsed sentences (such as RCL, generic Framenet, or other domain-specific semantic definition). For semantic tagging, the system can train a maximum entropy sequence tagger for assigning semantic label and value to each word in a sentence, such as type cube or color blue, for example. However, instead of a maximum entropy based model, the system can substitute any method of assigning semantic tags to a sequence. When a "maximum entropy" model is discussed herein, the maximum entropy model can be replaced with any suitable approach for assigning semantic tags.

For parsing, the system can use a semantic parser trained on non-lexical semantic representation. For reference resolution, a maximum entropy model can be trained to identify entities for reference tags assigned either in the tagging or parsing phase. Tagging, parsing, and reference resolution components can generate multiple hypotheses.

In spatial validation, the system re-ranks these hypotheses by validating the hypotheses against the spatial configuration. The system returns or indicates the top valid hypothesis according to the spatial configuration. Separating the tagging and parsing stages can provide several advantages. The tagging stage provides flexibility to abstract from possible grammatical or spelling errors (in the case of typed natural language) in a command. The tagger assigns semantic category to each word in a sentence. Words that do not contribute to the semantic meaning are assigned a label of "0" or "null" by the tagger or are otherwise flagged to be ignored in the further processing. The system can assign a corrected tag to words that are misspelled, such as when a word similarity feature is included in building a tagging model. This can be important when processing output of spoken commands that may contain recognition errors.

Such a system for processing spoken commands can be constructed in various embodiments and configurations. Some of the various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of the spoken command processing system for robotic control will then follow.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3)

interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
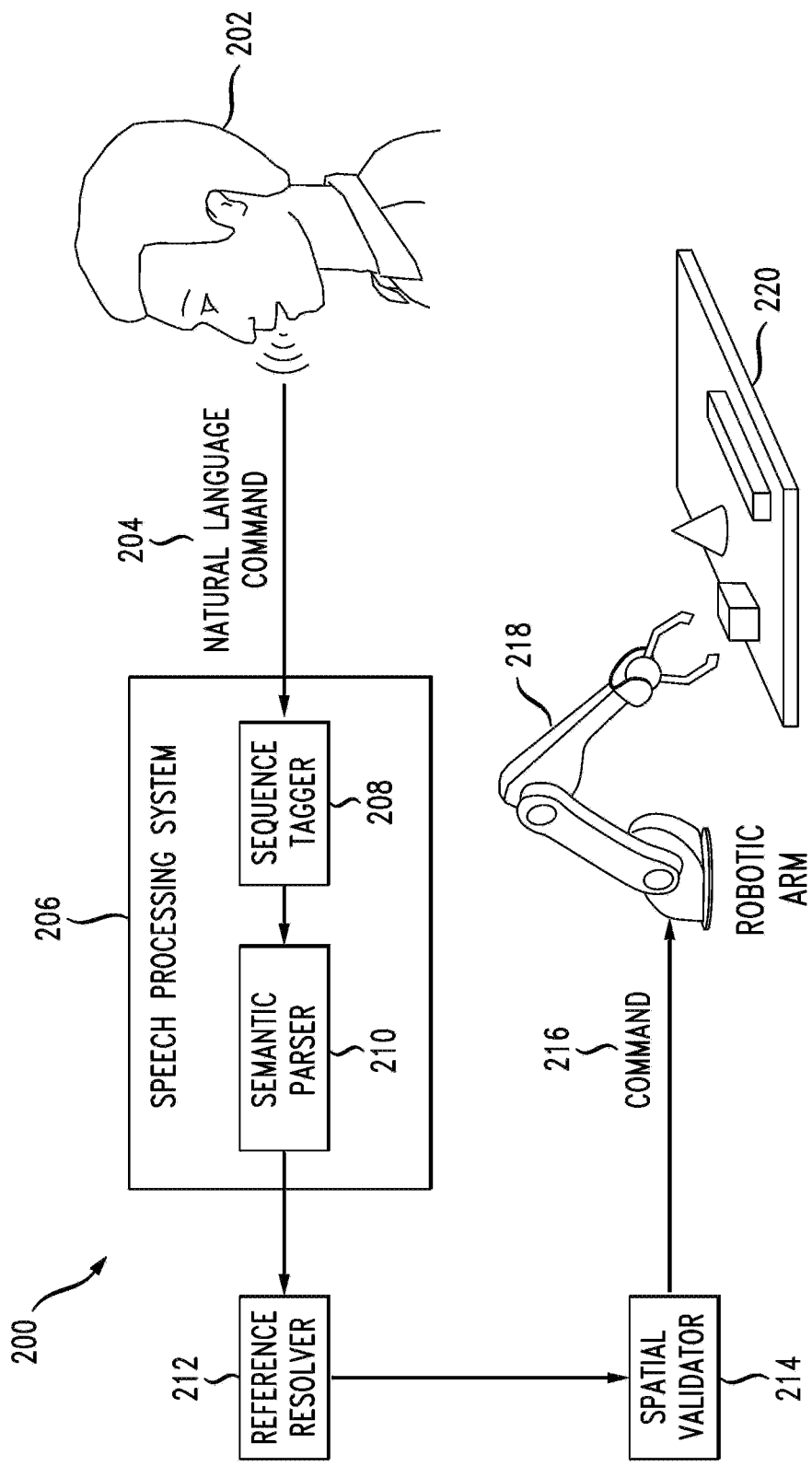
FIG. 2 illustrates an example natural language dialog system.

Having disclosed some components of a computing system, the disclosure now returns to a discussion of parsing natural language commands. FIG. 2 illustrates an example natural language dialog system 200. A user 202 utters a spoken natural language command 204. A speech processing system 206 receives the natural language command 204. The speech processing system 206 includes a sequence tagger 208 and a semantic parser 210.

Figure 4:
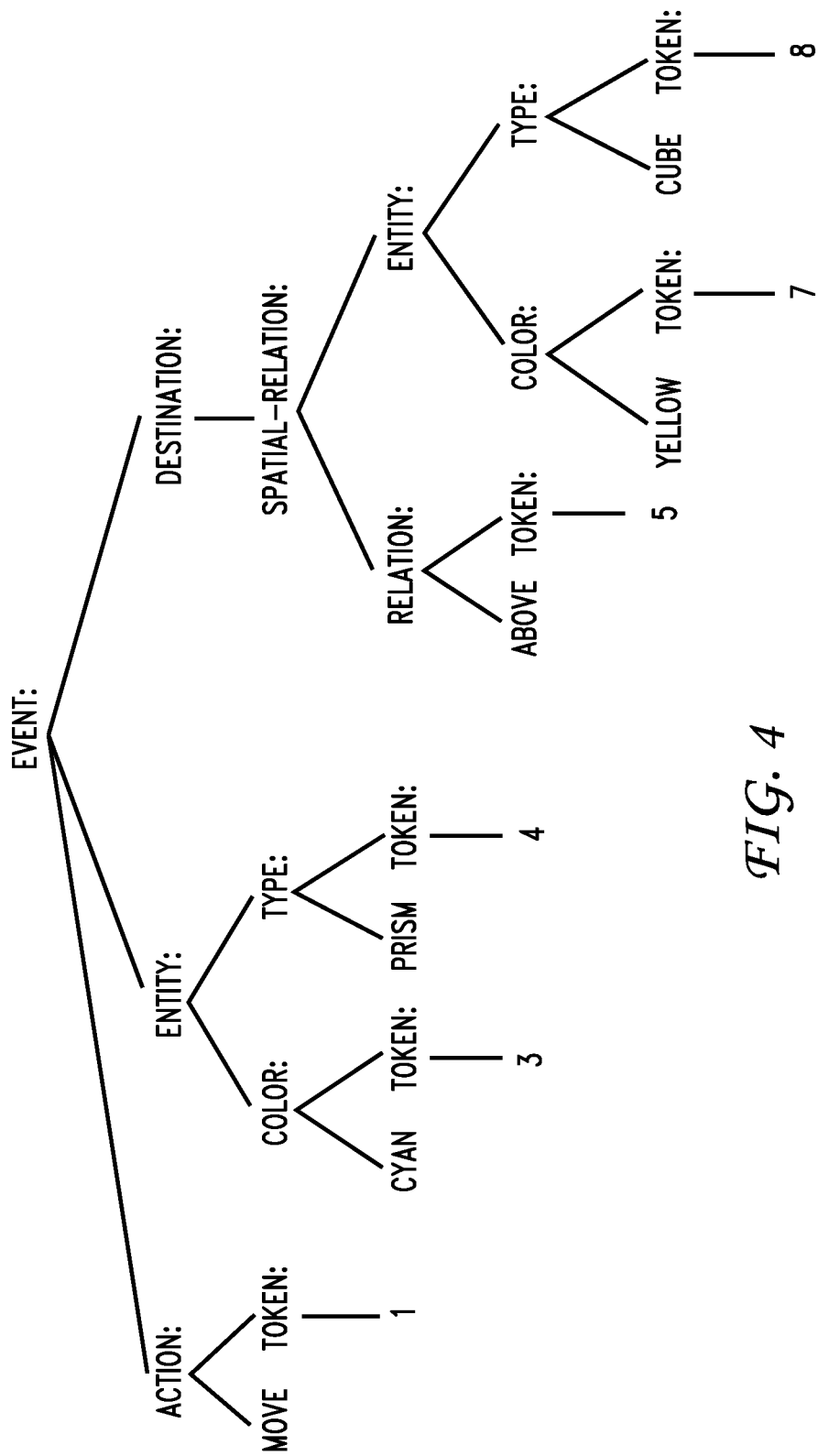
FIG. 4 illustrates an example parse tree for a spoken command.

The sequence tagger 208 is used for conditional inference of a tag sequence given either a word sequence or a tagged word sequence. A previous and/or a following tag may be used in each local classification. Sequence tagging is used for natural language tagging tasks, such as part of speech and named entity tagging. The sequence tagger 208 is trained to assign a combined semantic tag and label (such as type cube) to each word in a command. The tags used for training a sequence tagger are extracted from the leaf-level nodes of Robot Control Language (RCL) trees. Table 1, below, shows tags and labels for a sample sentence "Move the turquoise pyramid above the yellow cube" extracted from the RCL parse tree shown in FIG. 4. Note that in some cases, a label is the same as a word (yellow, cube) while in other cases, it differs (turquoise—cyan, pyramid—prism).

TABLE 1

| Word | Index | Tag | Label |
|---|---|---|---|
| Move | 1 | action | move |
| The | 2 | O | — |
| Turquoise | 3 | color | cyan |
| Pyramid | 4 | type | prism |
| Above | 5 | relation | above |
| The | 6 | O | — |
| Yellow | 7 | color | yellow |
| Cube | 8 | Type | cube |

The sequence tagger 208 can be trained using maximum entropy classification to predict the combined semantic tag and semantic label of each word. The sequence tagger 208 can operate in two-stages. A first stage assigns a part-of-speech tag and a second stage assigns a semantic tag and label. The sequence tagger 208 can also assign a tag and label in a single step, but combining these steps may result in lower performance or lower accuracy. The sequence tagger 208 and the semantic parser 210 can use statistical models trained on different data sets. The different training data sets can entirely or partially overlap. The sequence tagger 208, for example, can use a gazetteer of tags, such as for a list of available songs, a list of available objects to manipulate, or a list of place names. The semantic parser 210 can be trained on a completely different data set that does not include any of the tags from which the sequence tagger 208 selects. One specific example of a semantic parser 210 is a constituency parser.

The speech processing system 206 can include multiple sequence taggers 208, each tuned for a different domain. Then each of the multiple sequence taggers can process the natural language speech command 204 to produce multiple outputs with different confidences from which the speech processing system 206 selects a best candidate. Alternatively, the speech processing system 206 can identify a domain for the natural language command 204 and select one of the multiple sequence taggers 208 to process the natural language command 204.

After the sequence tagger 208 processes and tags the natural language command 204 from the user 202, the semantic parser 210 in the speech processing system 206 receives those tags as input. The semantic parser 210 builds RCL trees from the sequence of tags assigned by a sequence tagger 208, such as "action color type relation color type" for the example in FIG. 4. The semantic parser 210 generates multiple RCL parse tree hypotheses sorted in the order of their likelihood. Likelihood of a tree T given a sequence of tags T is determined using a probabilistic context free grammar (PCFG) G using the algorithm below:

$$P(T|S) = \prod_{r \in T} P_G(r)$$

The semantic parser 210 can determine the n-best parses using the CKY algorithm, for example, which records the n-best hyperedge back-pointers per constituent. The semantic parser 210 determines G and estimates PG from a corpus of non-lexical RCL trees generated by removing all nodes descendant from the tag nodes.

Then, the speech processing system 206 provides one or more of the n-best parses to a reference resolver 212. The reference resolver 212 identifies the most probable reference ID for each reference tag within a sentence. The reference resolver 212 operates on each sentence where the sequence tagger 208 assigns a reference tag to one of the words (e.g. to a pronoun) or where the semantic parser 210 inserts a tag into the lexical RCL tree (e.g. an ellipse). The system can use and/or train a binary maximum entropy model for reference classification as part of the reference resolver 212. The reference resolver 212 can extract reference IDs and features used for classification from the RCL semantic parse trees. Each segment preceding the reference tag and corresponding to an entity subtree is a candidate for being an ID of this reference.

The reference resolver 212 can be trained using a preceding and following word and tag/label of the reference and the candidate ID. The reference resolver 212 returns a probability that an entity segment is an ID for a given reference. Co-reference resolution applies when multiple candidates for a reference ID are present. For example, in the sentence "Pick up the red cube standing on a grey cube and place it on top of the yellow one", the reference "it" has two candidate ids corresponding to entity segments the red cube and a grey cube. The reference resolver 212 selects a segment for which a reference tagger returns the highest score, thereby identifying "it" as referring to one of the red cube or the grey cube. The reference resolver 212 resolves each ambiguous reference in the natural language command 204. In the instance that the natural language command 204 does not contain any ambiguous references, then the reference resolver 212 processes the output from the speech processing system 206 and identifies that no references need to be resolved.

The spatial validator 214 receives the tagged, parsed, reference resolved natural language command as input, or receives an RCL command based on the natural language command 204 as an input. The spatial validator 214 determines whether the command is executable in the given spatial context 220 for a target device 218 such as a robotic arm. The target device can be one or more individual devices which operate on a single or on multiple spatial contexts 220. While a robotic arm is shown, the principles herein can also apply to other mechanical, electrical, or virtual devices, including vehicles, manufacturing equipment, home automation equipment, wearable electronics, audio or video entertainment systems, and so forth. The spatial validator 214 has knowledge of the spatial context 220, whether preprogrammed, received through the target device, or based on data received from sensors such as video cameras, radar, internal sensors in objects in the spatial context 220, or some other spatial sensing mechanism. The spatial context 220 can include fixed parameters, such as a defined area or boundaries or object sizes within the boundaries, as well as dynamic parameters, such as the position and orientation of objects within the boundaries. In some contexts, the spatial context 220 is almost entirely dynamic, such as a robotic arm mounted on a mobile platform that can move about. In this case, while the spatial context 220 is dynamic, certain parameters may remain fixed, such as the range and other capabilities of the robotic arm to manipulate objects within the spatial context.

Due to the statistical nature of our approach, the spatial validator 214 can receive multiple hypotheses with different confidence values. The spatial validator 214 can validate the final output RCL command 216 by checking whether executing the RCL command 216 is physically possible. The spatial validator 214 does not interfere or get involved at all at the various preceding steps, such as at the sequence tagger 208, the semantic parser 210, or the reference resolver 212. The spatial validator 214 does not influence the computations or decisions at those steps, and instead operates on the combined output from those components.

Instead of computing an integrated single confidence value for an RCL command output, multiple candidates are computed and evaluated throughout the process. For example, the sequence tagger 208 computes multiple tagging outputs. For each tagging output ordered by their confidence values, the semantic parser 210 computes multiple parse outputs. In the same manner, for each parse output, the reference resolver 212 computes multiple co-reference resolution outputs. Then, the spatial validator 214 validates the highest confidence value output from the references resolver 212. If it is valid, the spatial validator 214 can return the result as an RCL command 216 for evaluation. Otherwise, the spatial validator 214 moves to the next output with a lower confidence value (first, in co-reference resolution, next in parsing, and then finally in tagging) until a valid result is identified or until all possible candidate commands are evaluated and determined to be invalid.

A validation tool or component can evaluate the output of each individual stage. For example, a first validation tool, not shown, can validate the output of the sequence tagger 208, a second validation tool, also not shown, can validate the output of the semantic parser 210, and a third validation tool, also not shown, can validate the output of the reference resolver 212. Alternatively, a single validation tool can validate outputs at multiple different phases. Validation tools can be integrated as part of the speech processing system 206, integrated with any of the sequence tagger 208, semantic parser 210, or the reference resolver 212. The validation tool can evaluate the various outputs fully or partially. Tightly coupled validation may help in computing hypotheses at each step (e.g., feature values based on possible entities or actions).

The system 200 shown in FIG. 2 was used in processing three subsets of experimental data summarized in Table 2 below. In the TEST2500 data set, the models were trained on the initial 2500 sentences of the Robot Commands Treebank and evaluated on the last 909 sentences, corresponding to the data split of the SemEval task. In the TEST500 data set, the models were trained on the initial 500 sentences of the training set and evaluated on the last 909 test sentences. These results illustrate the models' performance on a reduced training size. In the DEV2500 data set, models were trained on 90% of the initial 2500 sentences and evaluated on 10% of the 2500 sentences using a random data split. The test data show that sentence length and standard deviation of test sentences in the TEST2500 data set are higher than on the training sentences while in the DEV2500 dataset training and test sentence length and standard deviation are comparable.

TABLE 2

| # | Dataset | Avg # hyp | Accuracy |
|---|---|---|---|
| 1 | TEST2500 1-best | 1 | 86.0% |
| 2 | TEST2500 max-5 | 3.34 | 95.2% |
| 3 | TEST500 1-best | 1 | 67.9% |
| 4 | TEST500 max-5 | 4.25 | 83.8% |
| 5 | DEV2500 1-best | 1 | 90.8% |
| 6 | DEV2500 max-5 | 2.9 | 98.0% |

Table 2 shows sentence accuracy of the semantic tagging stage. The experimental data evaluated tagging accuracy on 1-best and on max-5 best tagger outputs. In the max-5 setting the number of hypotheses generated by the sequence tagger 208 varies for each input with the average numbers reported in Table 2. Tagging accuracy on TEST2500 using 1-best was 86.0%. The accuracy for the max-5 best tagging sequences was 95.2%. The accuracy for the TEST500 data set tagging was 67.9% and 83.8% on 1-best and max-5 best sequences respectively, approximately 8% points lower than on TEST2500 data set. The accuracy for the DEV2500 dataset tagging was 90.8% and 98.0% on 1-best and max-5 best sequences, 4.8% and 2.8% points higher than on TEST2500 data set. The higher accuracy on DEV2500 in comparison to the TEST2500 is based on the higher complexity of the test sentences in comparison to the training sentences in TEST2500 data set.

The semantic parser 210 was also evaluated using experimental data. Table 3, below, shows characteristics of this experimental data. The 1-best F-measure accuracy was based on the TEST2500 and DEV2500 semantic tag sequences was 96.17% and 95.20%, respectively. On DEV500, the accuracy remained 95.20%. On TEST2500 with system provided input sequences, the accuracy was 94.79% for 869 out of 909 sentences.

TABLE 3

| Name | Train # sent | Train Sent. Len. (stdev) | Test # sent | Test Sent. Len. (stdev) |
| --- | --- | --- | --- | --- |
| TEST2500 | 2500 | 13.44 (5.50) | 909 | 13.96 (5.59) |
| TEST500 | 500 | 14.62 (5.66) | 909 | 13.96 (5.59) |
| DEV2500 | 2500 | 13.43 (5.53) | 250 | 13.57 (5.27) |

Table 4, below, presents string accuracy of automatically generated RCL parse trees on each data set. The experimental results were obtained by comparing system output RCL parse string with the reference RCL parse string. For each data set, the system processed the experimental input data both with and without spatial validation. The semantic parser 210 and the reference resolver 212 processed automatically assigned semantic tags (Auto) and oracle tagging (Orcl) data. Some tag labels can be verified systematically and corrected them with simple rules: e.g., change "front" to "forward" because relation specification doesn't have "front" even though annotations included cases with "front" as relation.

TABLE 4

| # | Dataset | Tag | Accuracy without/with spatial validation |
| --- | --- | --- | --- |
| 1 | TEST2500 | Auto | 60.84/87.35 |
| 2 | TEST2500 | Orcl | 67.55/94.83 |
| 3 | TEST500 | Auto | 48.95/74.92 |
| 4 | TEST500 | Orcl | 63.89/94.94 |
| 5 | DEV2500 | Auto | 68.00/96.80 |
| 6 | DEV2500 | Orcl | 69.60/98.00 |

Accuracy on the TEST2500 data set using automatically assigned tags and no spatial validation was 60.84%. In this mode, the system used the 1-best parser and 1-best tagger output. With spatial validation, which allows the system to re-rank parser and tagger hypotheses, the performance increased to 87.35%. This indicates that the sequence tagger 208 and the semantic parser 210 often produce correct output which is not ranked first. Using oracle tags without/with spatial validation on TEST2500 data set the system accuracy is 67.55%/94.83%, 7% points above the accuracy using predicted tags.

Accuracy on the TEST500 data set using automatically assigned tags with/without spatial validation is 48.95%/74.92%, approximately 12% points below the performance on TEST2500. Using oracle tags without/with spatial validation the performance on TEST500 data set was 63.89%/94.94%. The performance without spatial validation is only 4% below TEST2500, while with spatial validation the performance on TEST2500 and TEST500 is the same. These results indicate that most performance degradation on a smaller data set is due to the semantic sequence tagger 208.

The system performance on DEV2500 data set using automatically assigned tags without/with spatial validation was 68.0%/96.80%, 8% points above the performance on TEST2500. With oracle tags, the performance was 69.60%/98.0%, which is 2-3% points above TEST2500. These results indicate that improvement in accuracy on a better balanced data set DEV2500 is due to better semantic tagging.

Figure 3:
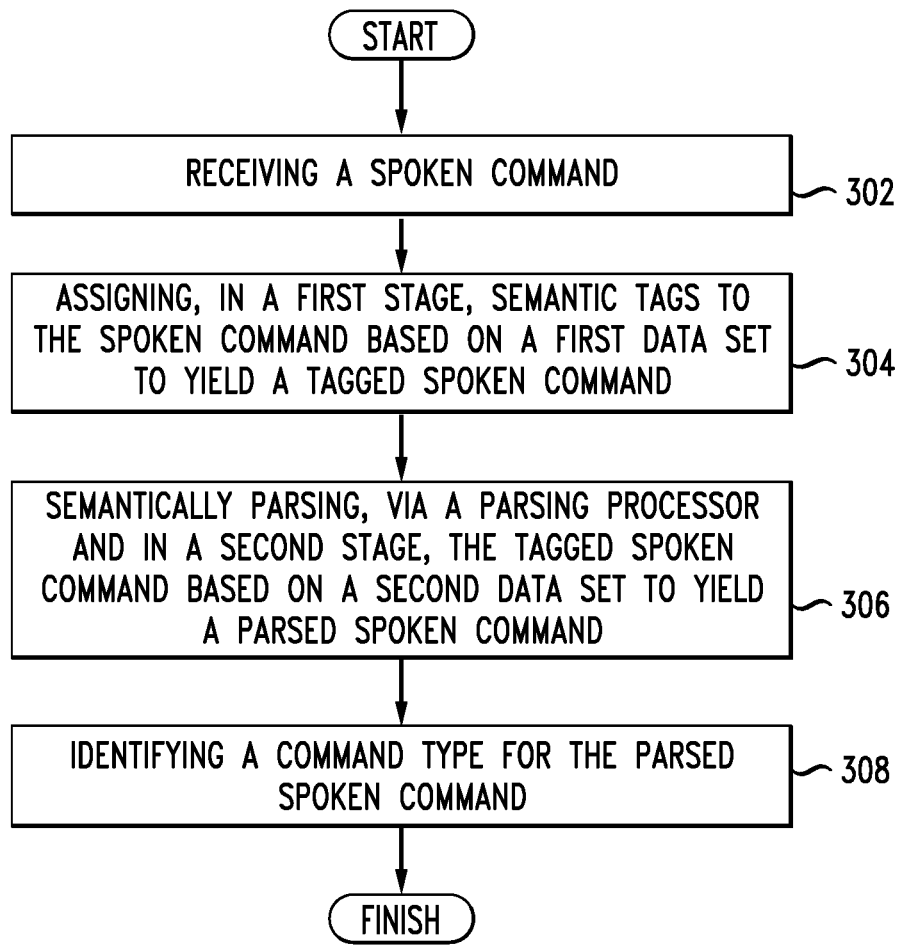
FIG. 3 illustrates an example method embodiment.

FIG. 3 illustrates an example method embodiment. The method embodiment can include the steps shown as well as other steps, and can exclude certain steps. The steps shown can be performed in orders other than that shown in FIG. 3. A system implementing the example method receives a spoken command (302). The system can assign, in a first stage, semantic tags to the spoken command based on a first data set to yield a tagged spoken command (304). Example semantic tags can identify at least one of locations, titles, and proper names. These are just a few examples of semantic tags. Many other types of semantic tags can be used depending on the intended domain. For example, semantic tags can identify in the input command one or more entity types, such as locations and people, and can identify one or more event or action types, such as "move" or "drop." The system can assign the semantic tags using a maximum entropy sequence tagger.

The system can semantically parse, in a second stage, the tagged spoken command based on a second data set to yield a parsed spoken command (306). A semantic parser trained on a non-lexical semantic tree can parse the tagged spoken command, for example.

The system can then identify a command type for the parsed spoken command (308). After the command type is identified, the system can perform spatial validation based on the command type for a context of the spoken command. The spatial validation can be based on a condition of a target area associated with the spoken command. The target area can include a working area within reach of a robotic arm, and the condition of the target area can include presence and positions of objects in the working area. If the spatial validation indicates that certainty of the command type identified meets a certainty threshold, the system can execute the spoken command, and if the spatial validation indicates that certainty of the command type identified does not meet the certainty threshold, the system can prompt for clarification of the spoken command. Alternatively, the system can simply take some other action to handle the command, such as ignore the command, request confirmation of the hypothesis with the highest confidence, or generate an error notification.

Spatial validation is provided as one example kind of validation. The system can validate the command type in different domains of use, depending on the domain and the state of the domain. For robots manipulating objects, the validation is spatial. For an appointment schedule, the validation can be temporal. The type of validation can be domain-specific.

The system can perform reference resolution on the spoken command to uniquely identify one of the objects in the working area. For example, reference resolution may be performed when the spoken command refers to an object as "it" or by some other non-explicit label.

The spoken command can be directed to a physical robotic appendage or a virtual robotic appendage, for example. Then, the system can output the parsed spoken command according to the command type and according to a robot control language. The system can generate outputs of different types or in different languages to accommodate different types of target devices. For example, the system can convert spoken commands directed to a home automation component to an X10 command. The system can transmit the command to a single target device or to a set of target devices that operate in concert to accomplish the task. In one embodiment, the spoken command identifies which target device is to perform which portion of the spoken command. The system can transmit the commands to the target devices directly via a wired or wireless connection, or can transmit the commands over a network, such as a local area network, a mesh network, or the Internet.

For diagnostic purposes, the system can output a semantic tree and/or any other data generated or gathered while processing the spoken language command. In this way, a human user can review the progress of the system in interpreting and implementing a particular spoken command. The system can output to a visible display or to a log file, for example.

The approaches disclosed herein provide results of semantic processing for natural language robot commands using Tag & Parse. The system first tags the input sentence and then applies non-lexical parsing to the tag sequence. The system performs reference resolution to the resulting parse trees. The experimental data on the models trained on the data sets of size 500 (TEST500) and 2500 (TEST2500) sentences demonstrate that that sequence tagging model degrades significantly on a smaller data set. Parsing and reference resolution models, on the other hand, perform nearly as well on both training sizes. The semantic tagging model is more sensitive to the difference between training and test set than parsing model degrading significantly a less homogeneous data set. The experimental results show that both tagging and parsing models can benefit from an improved re-ranking, and that the parsing model is robust to a data size reduction while the tagging model requires a larger training data set.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
assigning, via a sequence tagger, a part of speech, a semantic tag and a label to each work in a natural language command addressed to a robot to yield a tagged natural language command; and
semantically parsing, via a processor and a semantic parser, the tagged natural language command to yield a parsed natural language command, wherein a data set used to train the semantic parser does not include any tag from which the sequence tagger selects for assigning the semantic tag,
receiving the parsed natural language command for execution by the robot; and
moving the robot according to a spatial validation of a physical context of the parsed natural language command when applied to the robot.

2. The method of claim 1, wherein the robot comprises a robotic arm.

3. The method of claim 1, further comprising:
identifying a command type for the parsed natural language command and wherein moving the robot is according to the command type.

4. The method of claim 3, further comprising, after identifying the command type:

performing the spatial validation, based on the command type, for the physical context of the natural language command when applied to the robot; and if the spatial validation indicates that a certainty of the command type meets a certainty threshold, executing the natural language command; and if the spatial validation indicates that the certainty of the command type does not meet the certainty threshold, prompting for clarification of the natural language command.

5. The method of claim 4, wherein the spatial validation is based on a condition of a target area associated with the parsed natural language command.

6. The method of claim 5, wherein the target area comprises a working area of the robot, and wherein the condition of the target area comprises presence and positions of objects in the working area.

7. The method of claim 6, further comprising:
performing reference resolution on the parsed natural language command to uniquely identify one of the objects in the working area.

8. The method of claim 3, wherein the parsed natural language command is directed to one of a physical robotic appendage or a virtual robotic appendage.

9. The method of claim 8, further comprising outputting the parsed natural language command according to the command type and according to a robot control language.

10. The method of claim 1, wherein the semantic tag identifies entity types and event types in the natural language command.

11. The method of claim 1, wherein the semantic tag is assigned using a maximum entropy sequence tagger.

12. The method of claim 1, wherein a semantic parser trained on a non-lexical semantic tree parses the tagged natural language command.

13. A system comprising:
a processor; and
a computer-readable storage medium having instructions stored which, when executed by the processor, cause the processor to perform operations comprising:
receiving a parsed natural language command for execution by a robot; and
moving the robot according to a spatial validation of a physical context of the parsed natural language command when applied to the robot, wherein the parsed natural language command was generated by operations comprising:
assigning, via a sequence tagger, a part of speech, a semantic tag and a label to each word in a natural language command addressed to the robot to yield a tagged natural language command; and
semantically parsing, via a processor and a semantic parser, the tagged natural language command to yield the parsed natural language command, wherein a data set used to train the semantic parsor does not include any tag from which the sequence tagger selects for assigning the semantic tag.

14. The system of claim 13, wherein the robot comprises a robotic arm.

15. The system of claim 13, wherein the computer-readable storage medium stores additional instructions stored which, when executed by the processor, cause the processor to perform operations further comprising:
identifying a command type for the parsed natural language command and wherein moving the robot is according to the command type.

16. The system of claim 15, wherein the computer-readable storage medium stores additional instructions stored which, when executed by the processor, cause the processor to perform operations further comprising:
after identifying the command type:
performing the spatial validation, based on the command type, for the physical context of the natural language command when applied to the robot; and
if the spatial validation indicates that a certainty of the command type meets a certainty threshold, executing the natural language command; and
if the spatial validation indicates that the certainty of the command type does not meet the certainty threshold, prompting for clarification of the natural language command.

17. The system of claim 13, wherein the semantic tag identifies entity types and event types in the natural language command.

18. The system of claim 13, wherein the spatial validation is based on a condition of a target area associated with the natural language command.

19. A non-transitory computer-readable storage device having instructions stored which, when executed by a computing device, cause the computing device to perform operations comprising:
receiving a parsed natural language command for execution by a robot; and
moving the robot according to a spatial validation of a physical context of the parsed natural language command when applied to the robot, wherein the parsed natural language command was generated by operations comprising:
assigning, via a sequence tagger, a part of speech, a semantic tag and a label to each word in a natural language command addressed to the robot to yield a tagged natural language command; and
semantically parsing, via a processor and a semantic parsor, the tagged natural language command to yield the parsed natural language command, wherein a data set used to train the semantic parsor does not include any tag from which the sequence tagger selects for assigning the semantic tag.

* * * * *